United States Patent
Ueno

(10) Patent No.: US 8,982,336 B2
(45) Date of Patent: *Mar. 17, 2015

(54) PHYSICAL QUANTITY SENSOR AND PHYSICAL QUANTITY MEASURING METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 13/583,218

(22) PCT Filed: Mar. 10, 2010

(86) PCT No.: PCT/JP2010/053967
§ 371 (c)(1),
(2), (4) Date: Sep. 18, 2012

(87) PCT Pub. No.: WO2011/111181
PCT Pub. Date: Sep. 15, 2011

(65) Prior Publication Data
US 2013/0033696 A1  Feb. 7, 2013

(51) Int. Cl.
*G01P 3/36* (2006.01)
*G01S 17/32* (2006.01)
(Continued)

(52) U.S. Cl.
CPC .............. *G01S 17/325* (2013.01); *G01S 17/58* (2013.01); *G01B 9/02092* (2013.01); *G01S 7/4915* (2013.01); *G01S 7/4916* (2013.01)
USPC .......................................... 356/28.5; 356/28

(58) Field of Classification Search
USPC ........... 356/28, 28.5, 4.1, 5.1, 5.09, 5.15, 498
See application file for complete search history.

(56) References Cited

U.S. PATENT DOCUMENTS 2,333,245 A * 11/1943 Hansell .................... 348/611
4,066,999 A    1/1978 Spanjersberg et al.
(Continued)

FOREIGN PATENT DOCUMENTS

CN    101203729 A    6/2008
CN    102192707 A    9/2011
(Continued)

OTHER PUBLICATIONS

Japanese Office Action, dated Nov. 29, 2013, which issued during the prosecution of Japanese Patent Application No. 2008-288518, which corresponds to the present application.
(Continued)

*Primary Examiner* — Luke Ratcliffe
*Assistant Examiner* — Assres H Woldemaryam
(74) *Attorney, Agent, or Firm* — Troutman Sanders LLP

(57) ABSTRACT

A physical quantity sensor includes a semiconductor laser for irradiating an object with a laser beam, and a laser driver for operating the semiconductor laser in such a way that a first oscillation period for which the oscillation wavelength increases and/or a second oscillation period for which the oscillation wavelength decreases is repetitively present. The sensor further includes a photodiode and a current-voltage conversion amplifying unit both for detecting an MHP containing an interference waveform formed by the self-coupling effect between the laser beam and the returning light beam from the object, a MHP extracting unit for measuring the period of the interference waveform contained in the output signal from the current-voltage conversion amplifying unit each time the interference waveform is inputted, and a computing unit for computing the displacement and/or the speed of the object from the measured individual period MHP extracting unit.

18 Claims, 16 Drawing Sheets

(51) Int. Cl.
*G01S 17/58* (2006.01)
*G01B 9/02* (2006.01)
*G01S 7/491* (2006.01)

(56) References Cited

U.S. PATENT DOCUMENTS

| | | | |
|---|---|---|---|
| 5,194,907 | A | 3/1993 | Hayashi |
| 5,867,536 | A * | 2/1999 | Lyons et al. ............... 375/295 |
| 6,839,850 | B1 | 1/2005 | Campbell et al. |
| 6,872,931 | B2 | 3/2005 | Liess et al. |
| 7,684,957 | B2 * | 3/2010 | Ueno .......................... 702/158 |
| 7,911,593 | B2 * | 3/2011 | Ueno .......................... 356/28.5 |
| 7,961,302 | B2 | 6/2011 | Ueno |
| 8,446,574 | B2 | 5/2013 | Ueno |
| 2003/0201404 | A1 * | 10/2003 | Shiraishi ..................... 250/548 |
| 2008/0181354 | A1 * | 7/2008 | Ueno ............................ 377/24 |
| 2009/0195771 | A1 | 8/2009 | Ueno |
| 2009/0257067 | A1 | 10/2009 | Chapman |
| 2009/0279070 | A1 * | 11/2009 | Ueno .......................... 356/28.5 |
| 2010/0332171 | A1 | 12/2010 | Ueno |
| 2011/0228254 | A1 * | 9/2011 | Ueno .......................... 356/5.09 |
| 2012/0290242 | A1 | 11/2012 | Ueno |

FOREIGN PATENT DOCUMENTS

| | | |
|---|---|---|
| EP | 1978377 | 10/2008 |
| EP | 2085789 | 8/2009 |
| JP | 45-22386 | 7/1970 |
| JP | S63-255571 | 10/1988 |
| JP | H02-287109 A | 11/1990 |
| JP | H04-089507 A | 3/1992 |
| JP | 10-90396 | 4/1998 |
| JP | H11-201722 A | 7/1999 |
| JP | H11-287859 A | 10/1999 |
| JP | 2004-513348 | 4/2004 |
| JP | 2006-105669 A | 4/2006 |
| JP | 2006-313080 | 11/2006 |
| JP | 2006313080 * 11/2006 ............ G01B 11/00 |
| JP | 2008-175602 | 7/2008 |
| JP | 2009-47676 | 3/2009 |
| JP | 2009-092461 | 4/2009 |

OTHER PUBLICATIONS

Japanese Office Action, dated Feb. 6, 2013, which issued during the prosecution of Japanese Patent Application No. 2008-288518, which corresponds to the present application.

International Search Report (ISR) with date of mailing of Apr. 13, 2010 for PCT/JP2010/053967, upon which the instant U.S. National Stage application is based.

Chinese Office Action, dated Jul. 26, 2013, which issued during the prosecution of Chinese Patent Application No. 201080065281.9.

Extended European Search Report, dated Nov. 4, 2011, which issued during prosecution of European Patent Application No. 11150186.2.

Japanese Office Action dated Feb. 6, 2014, which issued during prosecution of Japanese Patent Application 2009-153487.

* cited by examiner

PHYSICAL QUANTITY SENSOR AND PHYSICAL QUANTITY MEASURING METHOD

CROSS REFERENCE TO PRIOR APPLICATION

This application is a U.S. National Phase application under 35 U.S.C. §371 of International Application No. PCT/JP2010/053967, filed on Mar. 10, 2010. The International Application was published on Sep. 15, 2011 as WO 2011/111181 A1 under PCT Article 21(2). The disclosure of the International Application is incorporated herein by reference.

FIELD OF TECHNOLOGY

The present disclosure relates to a physical quantity sensor and physical quantity measuring method for measuring displacement and velocity of an object from interference information that is produced through the self-coupling effect between a laser beam that is emitted from a semiconductor laser and return light from the object.

BACKGROUND

In techniques for measuring displacement (or velocity) using the principle of interference, such as FMCW (Frequency Modulated Continuous Wave) radar, a standing wave radar, or a self-mixing laser sensor, typically MHP processing such as FFT (Fast Fourier Transform) or an interference fringe counting process, or the like, is used when calculating the displacement or velocity of an object being measured based on the frequency of beats or interference fringes. However, there is a problem in that the establishment of high resolution through FFT requires data over a long sampling interval with a high sampling frequency, requiring excessively large processing time. Moreover, in the process for counting interference fringes, measuring displacements that are less than half a wavelength has required physical vibrations of the sensor, or analysis of the amplitudes of the interference fringes, and thus there has been a problem in that it has only been possible to measure the vibrations that are the periodic motion that is measured, and, additionally, a problem in that the interference fringe counting process has been time-consuming.

On the other hand, the present inventor has proposed a laser measuring device of a wavelength modulation type that uses the self-coupling effect of a semiconductor laser (See Japanese Unexamined Patent Application Publication 2006-313080 ("Patent Document 1")). The structure of this laser measuring device is illustrated in FIG. 15. The laser measuring device of FIG. 15 includes: a semiconductor laser 201 that emits a laser beam toward an object 210; a photodiode 202 that converts, into an electric signal, the optical power of the semiconductor laser 201; a lens 203 that condenses the beam of the semiconductor laser 201 onto the object 210 and that causes the return light from the object 210 to be incident into the semiconductor laser 201; a laser driver 204 for repetitively alternating between a first oscillating period wherein the oscillating wavelength of the semiconductor laser 201 is increased continuously and a second oscillating period wherein the oscillating wavelength is decreased continuously; a current-voltage converting amplifier 205 for converting into a voltage, and then amplifying, the output current from the photodiode 202; a MHP extracting circuit 206 for taking the second derivative of the output voltage of the current-voltage converting amplifier 205; a counting circuit 207 for counting the number of MHPs (mode hop pulses) included in the output voltage of the MHP extracting circuit 206; a calculating device 208 for calculating the distance to the object 210 and the velocity of the object 210; and a display device 209 for displaying the calculation results by the calculating device 208.

The laser driver 204 provides, to the semiconductor laser 201, as an injection current, a triangle-wave driving current that repetitively rises and falls at a constant rate of change over time. Doing so causes the semiconductor laser 201 to be driven so as to repetitively alternate between a first oscillating period, wherein the oscillating wavelength increases continuously at a constant rate of change, and a second oscillating period, wherein the oscillating wavelength increases continuously at a constant rate of change. FIG. 16 is a diagram illustrating the change in the oscillating wavelength of the semiconductor laser 201 over time. In FIG. 16, P1 is the first oscillating period and P2 is the second oscillating period, wherein $\lambda a$ is the minimum value for the oscillating wavelength in each of the periods, $\lambda b$ is the maximum value for the oscillating wavelength in each of the periods, and Tt is the period of the triangle wave.

The laser beam that is emitted from the semiconductor laser 201 is condensed by the lens 203 to be incident on the object 203. The light that is reflected by the object 210 is focused by the lens 203 to be incident into the semiconductor laser 201. The photodiode 202 converts, into an electric current, the optical power of the semiconductor laser 201. The current-voltage converting amplifier 205 converts into a voltage, and then amplifies, the output current from the photodiode 202. The MHP extracting circuit 206 takes the second derivative of the output voltage from the current-voltage converting amplifier 205. The counting circuit 207 counts the mode hop pulses (MHPs) included in the output voltage of the MHP extracting circuit 206, doing so separately for the first oscillating period P1 and the second oscillating period P2. The calculating device 208 calculates the distance to the object 210 and the velocity of the object 210 based on the minimum oscillating wavelength $\lambda a$ and the maximum oscillating wavelength $\lambda b$ of the semiconductor laser 201 and on the number of MHPs in the first oscillating period P1 and the number of MHPs in the second oscillating period P2. In this way, it is possible to use a self-coupling-type laser measurement device to measure a displacement with a resolution of about one half the wavelength of the semiconductor laser 201, and to measure a distance with a resolution that is inversely proportional to the magnitude of wavelength modulation in the semiconductor laser 201.

The self-coupled laser measuring device enables measurements of displacement and velocity of an object at a higher resolution than when compared to the conventional FMCW radar or standing-wave radar self-mixing laser sensor, or the like. However, because the self-coupled laser measuring device measuring time that is adequate in order to calculate the displacement and velocity, in the same way as with FFT, is required (which, in the example in Patent Document 1 is a half period of the carrier wave for the oscillating wavelength modulation of the semiconductor layer), there is a problem in that there is a calculation error in calculations for objects wherein the changes in velocity are rapid. Moreover, because it is necessary to count the number of MHPs during the MHP period, there is a problem in that it is difficult to achieve a resolution less than a half wavelength of the semiconductor laser.

The present disclosure addresses the problems set forth above, and the object thereof is to provide a physical quantity sensor and physical quantity measuring method able to measure a displacement and a velocity of an object with high resolution, and able to reduce the time required in the measurement.

SUMMARY

The physical quantity sensor according to the present disclosure includes: a semiconductor laser for emitting a laser beam toward an object to be measured; an oscillating wavelength modulator for causing the semiconductor laser to operate so that there is at least a first oscillating period wherein the oscillating wavelength continuously increases monotonically and a second oscillating period wherein the oscillating wavelength continuously decreases monotonically; a detector for detecting an MHP that includes an interference waveform that is produced through the self-coupling effect between the laser beam that is emitted from the semiconductor laser and return light from the object being measured; a MHP extractor for measuring, each time an interference waveform is inputted, the period of the interference waveform that is included in the output signal from the detector; and a calculator for calculating at least a displacement or a velocity of the object being measured, based on the individual periods measured by the MHP extractor.

Moreover, in one example of the physical quantity sensor according to the present disclosure, the calculator calculates the displacement and/or the velocity of the object being measured from the frequency of the sampling clock for measuring the period of the interference waveform, a reference period, an average wavelength for the semiconductor laser, and an amount of change in the period measured by the MHP extractor relative to the reference period.

Additionally, one example of the physical quantity sensor according to the present disclosure further includes: a carrier wave adjustor able to adjust either an amplitude or a frequency of the oscillating wavelength modulation of the semiconductor laser.

Additionally, in one example of the physical quantity sensor according to the present disclosure: the carrier wave adjustor adjusts the amplitude or frequency of the carrier wave so that the period of the interference waveform when the object being measured is stationary, or the average of a specific number of periods of the interference waveform measured immediately prior to the adjustment, is a period that is specified in advance.

Additionally, in one example of the physical quantity sensor according to the present disclosure: the period that is specified in advance is a period that corresponds to a value that is one-half the maximum frequency of the interference waveform that can be processed by the physical quantity sensor.

Additionally, in one example of the physical quantity sensor according to the present disclosure: the carrier wave adjustor reduces the amplitude or frequency of the carrier wave by a specific amount.

Additionally, in one example of the physical quantity sensor according to the present disclosure: the carrier wave adjustor increases the amplitude or frequency of the carrier wave by a specific amount.

Additionally, in one example of the physical quantity sensor according to the present disclosure: the calculator uses, as the reference period, a period for the interference waveform when the object being measured is stationary.

Additionally, one example of the physical quantity sensor according to the present disclosure further includes: a counter for counting, separately for the first oscillating period and the second oscillating period, the number of interference waveforms included in the output signal of the detector; a distance calculator for calculating a distance to the object being measured from the minimum oscillating wavelength, the maximum oscillating wavelength, and the counting result by the counter during the interval over which the number of interference waveforms is counted by the counters; and a period calculator for calculating a period for the interference waveform from the distance calculated by the calculator; wherein: the calculator uses, as the reference period, the period calculated by the period calculator.

Additionally, one example of the physical quantity sensor according to the present disclosure further includes: a counter for counting, separately for the first oscillating period and the second oscillating period, the number of interference waveforms included in the output signal of the detector; a distance-proportional count calculator for calculating a distance-proportional count, which is a number of interference waveforms that is proportional to an average distance between the semiconductor laser and the object being measured, through calculating the average value of the number of interference waveforms; and a period calculator for calculating a period for the interference waveform from the distance-proportional count; wherein: the calculator uses, as the reference period, the period calculated by the period calculator.

The physical quantity measuring method according to the present disclosure includes: an oscillating step for causing a semiconductor laser to operate so that there is at least a first oscillating period wherein the oscillating wavelength continuously increases monotonically and a second oscillating period wherein the oscillating wavelength continuously decreases monotonically; a detecting step for detecting an MHP that includes an interference waveform that is produced through a self-coupling effect between the laser beam that is emitted from the semiconductor laser and return light from an object being measured; a MHP extracting step for measuring, each time an interference waveform is inputted, the period of the interference waveform that is included in the output signal obtained in the detecting step; and a calculating step for calculating at least a displacement or a velocity of the object being measured, based on the individual periods measured in the MHP extracting step.

Embodiments of the present disclosure enable measurement of the displacement and velocity of an object with higher resolution than conventionally, through performing calculations based on the periods of each of the interference waveforms that have been measured. Moreover, in contrast to the conventional self-coupled laser measuring device wherein a measurement time that is a half period of the carrier wave is required, in the present disclosure the displacement and velocity of the measured object can be calculated from the period of each individual interference waveform, thus making it possible to reduce greatly the time required for the measurement, enabling application to objects wherein the rate of change of velocity is high.

Additionally, in the present disclosure, a carrier wave adjustor is provided wherein it is possible to adjust the amplitude or frequency of the carrier wave for the oscillating wavelength modulation for the semiconductor laser to enable an appropriate selection of the item to be emphasized from among increasing the dynamic range of the measurement in relation to the velocity of the object being measured, increasing the resolution of the displacement and/or velocity, or increasing the measurement accuracy of the displacement and/or velocity.

DESCRIPTION

An embodiment according to the present disclosure is explained below in reference to the drawings.

Figure 1:
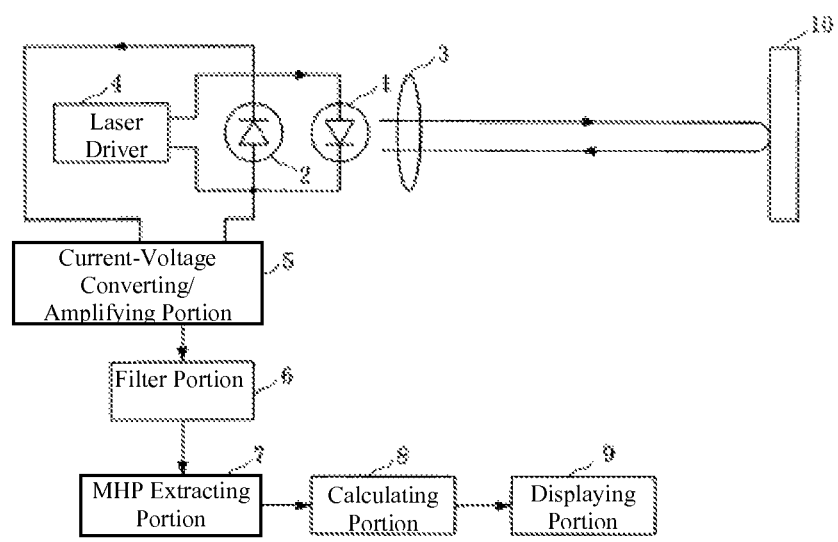
FIG. 1 is a block diagram illustrating the structure of a physical quantity sensor according to an embodiment according to the present disclosure.

FIG. 1 is a block diagram illustrating a structure of a physical quantity sensor according to the embodiment according to the present disclosure. The physical quantity sensor in FIG. 1 includes: a semiconductor laser 1 for emitting a laser beam at an object 10 that is to be measured; a photodiode 2 for converting into an electric signal the optical power of the semiconductor 1; a lens 3 for condensing and transmitting the beam from the semiconductor laser 1 and for condensing, and causing be incident into the semiconductor laser 1, the return light from the object 10; a laser driver 4 that is the oscillating wavelength modulator for modulating semiconductor laser 1; a current-voltage converting/amplifying portion 5 for converting into a voltage, and amplifying, the output current of the photodiode 2; a filter portion 6 for removing the carrier wave from the output voltage from the current/voltage converting/amplifying portion 5; a MHP extracting portion 7 for measuring the period of the mode hop pulses (MHPs) that are the self-coupled MHPs that are included in the output voltage from the filter portion 6; a calculating portion 8 for calculating the displacement and/or velocity of the object 10 based on the individual periods measured by the MHP extracting portion 7; and a display portion 9 for displaying the results of calculation by the calculating portion 8.

The photodiode 2 and the current-voltage converting/amplifying portion 5 form a detector. For convenience in the explanation below, it is assumed that the semiconductor laser 1 uses a type that does not have the mode hopping phenomenon (of the VCSEL type or a DFB laser).

Figure 16:
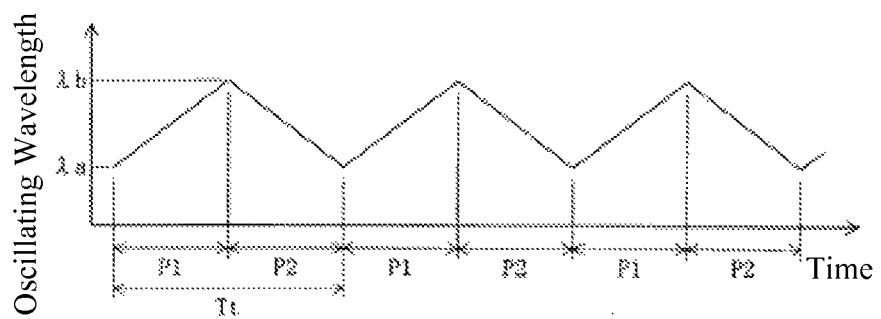
FIG. 16 is a diagram illustrating one example of change over time in the oscillating wavelength of the semiconductor laser in the laser measuring device FIG. 15.

The laser driver 4 supplies, to the semiconductor laser 1, as an injection current, a triangle wave driving current that repetitively increases and decreases with a constantly of change in respect to time. By doing so, the semiconductor laser 1 is driven so as to repetitively alternate between a first oscillating period P1, wherein the oscillating wavelength continuously increases at a constant rate of change, and a second oscillating period P2, wherein the oscillating wavelength continuously decreases at a constant rate of change, proportional to the size of the injection current. At this time, the change in the oscillating wavelength of the semiconductor laser 1 over time is as shown in FIG. 16. In the present embodiment, it is necessary for the rate of change of the oscillating wavelength of the semiconductor laser 1 to be constant.

The laser beam that is emitted from the semiconductor laser 1 is condensed by the lens 3, to fall incident on the object. The light that is returned from the object 10 is condensed by the laser 3, to be incident into the semiconductor laser 1. However, the condensation by the lens 3 is not essential. The photodiode 2 is disposed within the semiconductor laser 1 or in the vicinity thereof, and converts the optical power of the semiconductor laser 1 into an electric current. The current-voltage converting/amplifying portion 5 converts the output current from the photodiode 2 into a voltage, and then performs amplification. The filter portion 6 has the function of extracting the superimposed MHP from the modulated wave.

Figure 2:
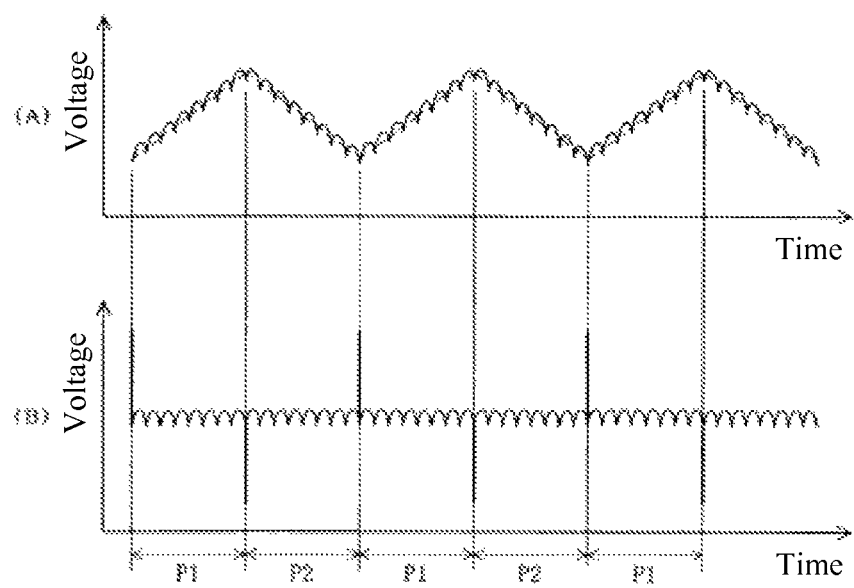
FIG. 2 is a waveform diagram illustrating schematically the output voltage waveform of a current/voltage converting/amplifying portion and the output voltage waveform of the filter portion in the embodiment according to the present disclosure.

FIG. 2(A) is a diagram illustrating schematically the output voltage waveform of the current/voltage converting/amplifying portion 5. FIG. 2(B) is a diagram illustrating schematically the output voltage waveform of the filter portion 6. These diagrams show process of eliminating the wave emitted from the semiconductor laser 1 in FIG. 2 (the carrier wave) from the wave of FIG. 2(A) (the modulated wave) corresponding to the output of the photodiode 2, and extracting the MHP waveform (the interference waveform) of FIG. 2(B).

Figure 3:
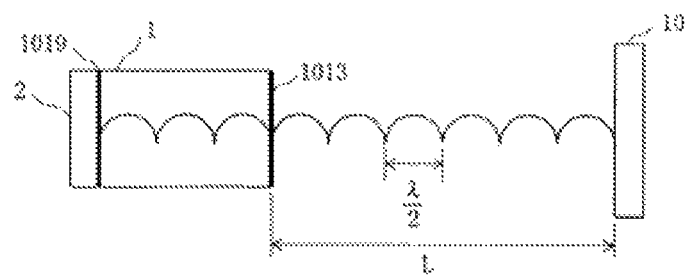
FIG. 3 is a diagram for explaining mode hop pulses.

Following this, each time an MHP is produced, the MHP extracting portion 7 measures the period of the MHP that is included in the output voltage of the filter portion 6. The MHPs, which are the self-coupled MHPs, are explained next. As illustrated in FIG. 3, if the distance from the mirror layer 1013 to the object 10, as illustrated in FIG. 3, is defined as L and the oscillating wavelength of the laser is defined as $\lambda$, then when the following resonance conditions are satisfied, the return light from the object 10 and the laser beam from the optical resonator within the semiconductor laser 1 are reinforce each other, to cause a slight increase in the laser power.

$$L = q\lambda/2 \tag{1}$$

In Equation (1), q is an integer. Even though the scattered light from the object 10 is extremely weak, this phenomenon can be fully observed by the amplifying effect that is produced through the increase in the apparent reflectivity within the resonator of the semiconductor laser 1.

Figure 4:
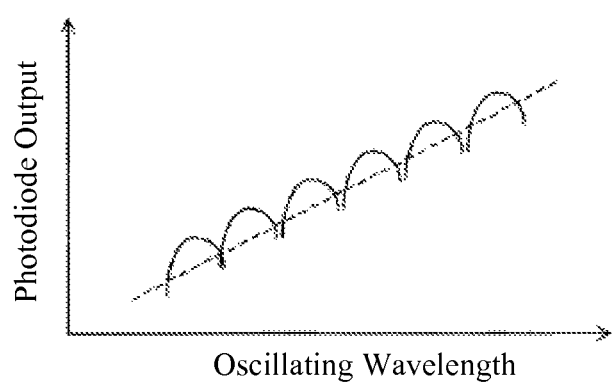
FIG. 4 is a diagram illustrating the relationship between the oscillating wavelength of the semiconductor laser and the output waveform of the photodiode.

FIG. 4 is a diagram illustrating the relationship between the oscillating wavelength and the output waveform of the photodiode 2 when the oscillating wavelength of the semiconductor laser 1 is changed at a constant rate. When L=q λ/2, indicated in Equation (1), is satisfied, then a phase difference between the return light and the laser beam within the optical resonator goes to 0° (in-phase), so that the return light and the laser beam within the optical resonator have maximal reinforcement, and when L=q λ/2+λ/4, then the phase difference is 180° (anti-phase), and the return light and the laser beam in the optical resonator are maximally negatively reinforced. Because of this, peaks and valleys appear alternatively within the laser power as the oscillating wavelength of the semiconductor laser 1 is varied, and when the laser power at these times is detected by the photodiode 2, the step-shaped waveforms that has a specific period is obtained as illustrated in FIG. 4. This waveform is commonly referred to as interference fringes. Each individual stair-step wave, that is, each individual interference fringe, is known as an MHP. As described above, when the oscillating wavelength of the semiconductor laser 1 is varied over a uniform time interval, then the number of MHPs changes proportionately to the distance being measured.

Figure 5:
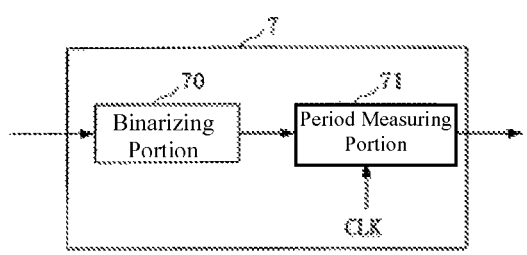
FIG. 5 is a block diagram illustrating an example of a structure for a MHP extracting portion in the embodiment according to the present disclosure.

FIG. 5 is a block diagram illustrating an example of configuration of the MHP extracting portion 7. A period measuring portion 71 is structured from the MHP extracting portion 7 and a binarizing portion 70.

FIG. 6(A) through (D) are diagrams for explaining the operation of the MHP extracting portion seven, where (A) is a diagram illustrating schematically the waveform of the output voltage from the filter portion 6, that is, the MHP waveform, (B) is a diagram illustrating the output of the binarizing portion 70 responding to (A), (C) is a diagram illustrating a sampling clock CLK that is inputted into the MHP extracting portion 7, and (D) is a diagram illustrating the results of measurement by the period measuring portion 71 corresponding to (B).

Figure 6:
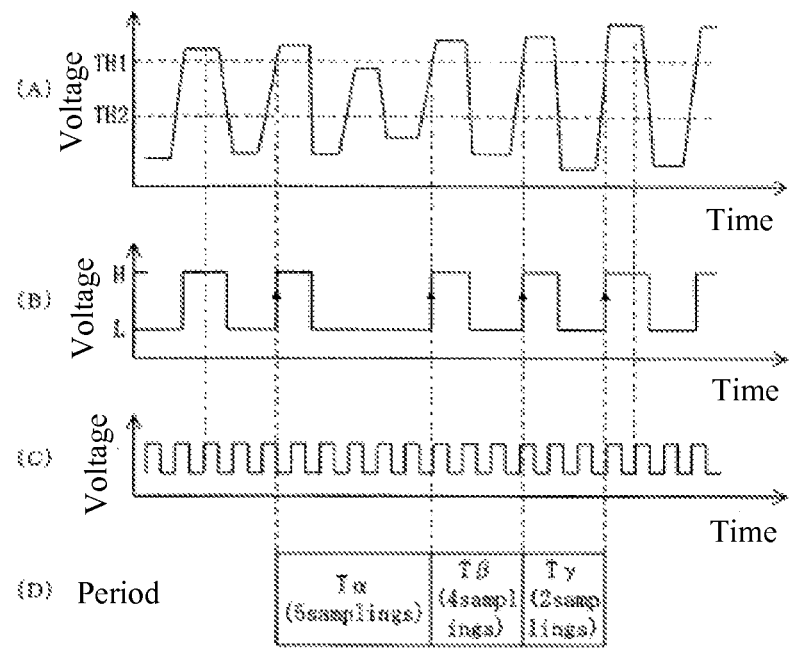
FIG. 6 is a diagram for explaining the operation of the MHP extracting portion in the embodiment according to the present disclosure.

First the binarizing portion 70 of the MHP extracting portion 7 evaluates whether the output voltage of the filter portion 6, illustrated in FIG. 6(A) is at the high level (H) for the low level (L), and outputs an evaluation result as shown in FIG. 6(B). At this time, the binarizing portion 70 evaluates the output voltage of the filter portion 6 as being at the high level when it rises to be above a threshold value TH1, and evaluates it as being at the low level when the output voltage of the filter portion 6 has fallen to be below a threshold value TH2 (where TH2<TH1), to binarize the output of the filter portion 6.

The period measuring portion 71 measures the period of the rising edge of the output of the binarizing portion 70 (that is, the period of the MHP) each time a rising edge occurs. At this time, the period measuring portion 71 measures the period of the MHP using, as a single unit, the period of the sampling clock CLK that is illustrated in FIG. 6(C). In the example in FIG. 6(D), the period measuring portion 71 sequentially measures Tα, Tβ, and Tγ, as MHP periods. As is understood from FIG. 6(C) and FIG. 6(D), the sizes of the periods Tα, Tβ, and Tγ are, respectively, 5 samplings, 4 samplings, and 2 samplings. The frequency of the sampling clock CLK is adequately high relative to the maximum frequency that can be assumed by the MHPs.

Following this, the calculating portion 8 calculates the displacement and velocity of the object 10 from the changes in the periods of the individual MHPs based on the results of measurement by the MHP extracting portion 7. When the frequency of the sampling clock is defined as fad [Hz], the reference period is defined as N0 [samplings], and the average oscillating wavelength of the semiconductor laser 1 is defined as λ [m], then when the period of the MHPs for the object being measured becomes longer by n [samplings] from the reference period N0, then the displacement D [m] of the object 10 during the period of the MHPs to which the measurement applies can be calculated as follows:

$$D = n \times \lambda / (2 \times N0) \tag{2}$$

The reference period N0 is the period of the MHPs when the object 10 is stationary, or the period of the MHPs at a distance that has been calculated. If the period of the MHPs which are subject to calculation has become shorter by n [samplings] from the reference period N0, then the sign on the magnitude of change in period n in Equation (2) should be negative. If, during the first oscillating period P1 wherein the oscillating wavelength of the semiconductor laser 1 is increasing the displacement D is positive, then the direction of movement of the object 10 is a direction that is becoming more distant from the semiconductor laser 1, but if the displacement D is negative, then the direction of movement of the object 10 is the direction that is becoming nearer to the semiconductor laser 1. Moreover, if, during the second oscillating period P2 wherein the oscillating wavelength is decreasing the displacement D is positive, then the direction of movement of the object 10 is in the direction that is becoming nearer to the semiconductor laser 1, but if the displacement D is negative, then the direction of movement of the object 10 is in the direction that is becoming more distant from the semiconductor laser 1. Note that the distance of the object 10 can be calculated from the reference period N0. The method by which to perform this calculation is the method for calculating in Patent Document 1, with the displacement defined as 0.

Moreover, because the frequency of the MHPs of the MHPs that are subject to the calculation is (N0+n)/fad, the velocity V [m/s] of the object 10 during the period of the MHP for the calculation is given by the following equation:

$$V = n \times \lambda / (2 \times N0) \times \text{fad} / (N0 + n) \tag{3}$$

The calculating portion 8 is able to calculate the displacement D of the object 10 using Equation (3) and is able to calculate the velocity V the of the object 10 using Equation (3). If, for example, the sampling frequency fad is 16 [MHz], the reference period N0 is 160 [samplings], and the average wavelength of the semiconductor laser 1 is 850 [nm], that if the period of the MHP for the calculation has increased by 1 [sampling] from the reference period N0, then the displacement D of the object 10 during the period of the MHP for the calculation can be calculated to be 5.31 [nm] and velocity V can be calculated to be 1.05 [mm/s]. The calculating portion 8 performs the calculation process described above each time an MHP is produced.

The display portion 9 displays the results of the calculation by the calculating portion 8.

Here the number of MHPs related to the distance from the object 10 for a half period of the carrier wave (the triangle wave) of the oscillating wavelength modulation of the semiconductor laser 1 is defined as NI. When the absolute value of the average velocity of the object 10 is defined as λ/2×Na when converted into a displacement over a half period of the carrier wave, then the number of MHPs per half period of the carrier wave is either NI+Na or Ni−Na. When moving at a velocity such that the displacement per half-period of the carrier wave is λ/2×Nb, then the number of MHPs per half-period of the carrier wave is Ni+Nb or Ni−Nb, and thus a period for the MHPs corresponding to this number appears. In calculating the displacement D and/or the velocity V of the object 10, the number of MHPs per half-period of the carrier wave may be back-calculated from the period of the individual MHPs, and the displacement D and/or velocity V of the object 10 may be calculated from this number of MHPs. Equation (2) and Patient (3), above, are based on this calculation principal. Note that the average velocity referenced above is the average velocity over one MHP interval.

In the self-coupled laser measuring device disclosed in Patent Document 1, the resolution for the displacement and velocity of the object is about a half wavelength λ/2 of the semiconductor laser. In contrast, in the present embodiment, the resolution for the displacement D and the velocity V is λ/2×n/N0, thus making it possible to achieve resolutions less than a half wavelength λ/2, enabling measurements to be performed with higher resolution than in the past.

As described above, in the present embodiment it is possible to measure the displacement D and velocity V of the object 10 with higher resolution than in the past. Moreover, in contrast to the half-period of the carrier wave that is the time required for the measurement in the self-coupled laser measuring device disclosed in Patent Document 1, in the present embodiment the displacement D and velocity V of the object 10 can be measured in the period of a single MHP, thus making it possible to reduce greatly the time required for the measurement, enabling application to objects 10 wherein the change in velocity is rapid.

Note that the period of an individual MHP has variability in a normal distribution even for objects 10 that are stationary, and thus processes such as taking moving averages may be performed in relation to the calculated displacements. Moreover, while in the present embodiment both the displacement and the velocity of the object 10 are measured, the measurement, of course, may be for either one or the other.

Figure 7:
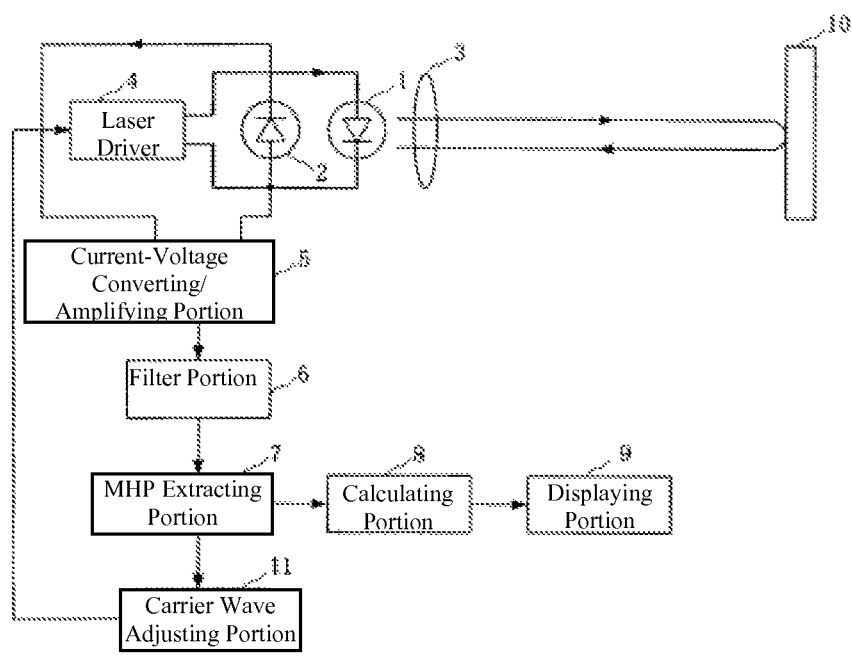
FIG. 7 is a block diagram illustrating the structure of a physical quantity sensor according to another embodiment according to the present disclosure.

Another embodiment according to the present disclosure is explained next. FIG. 7 is a block diagram illustrating the structure of a physical quantity sensor according to this embodiment according to the present disclosure, where those structures that are identical to those in FIG. 1 are assigned identical codes.

The physical quantity sensor in the present embodiment adds a carrier wave adjusting portion 11 to the physical quantity sensor of the above embodiment.

The carrier wave adjusting portion 11 adjusts the triangle wave driving current amplitude (the carrier wave amplitude) through the laser driver 4 so that the period T of the MHPs measured by the MHP extracting portion 7 is a period T0 that has been specified in advance, in response to a carrier wave adjusting instruction signal that is inputted from an operator, for example, at the time of initial setup when the object 10 is stationary. Here the period T0 that is set in advance is a period that the corresponds to a value that is one half of the maximum frequency fmax of the MHPs for which the physical quantity sampling can be performed. The maximum frequency fmax for the MHPs for which the physical quantity sampling can be performed is determined by the physical quantity sensor circuitry (for example, the op-amp that is included in the current-voltage converting/amplifying portion 5).

Figure 8:
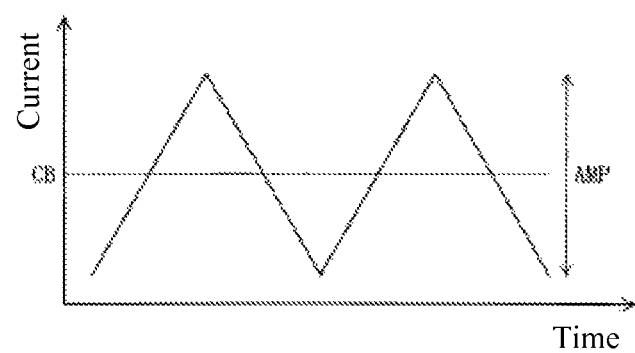
FIG. 8 is a diagram for explaining the method of adjusting the amplitude of the triangle wave driving current that is supplied to the semiconductor laser from the laser driver in the other embodiment according to the present disclosure.

FIG. 8 is a diagram for explaining the method of adjusting the amplitude of the triangle wave driving current that is supplied to the semiconductor laser 1 from the laser driver 4. In response to an instruction from the carrier wave adjusting portion 11, the laser driver 4 adjusts the amplitude AMP of the driving current while maintaining a constant DC component (DC bias) CB for the driving current.

Setting the period of the measured MHP to the period T0 that is specified in advance, as in the present embodiment, makes it possible to maximize the dynamic range of the measurement pertaining to the velocity V of the object 10.

Note that the carrier wave adjusting portion 11 may also adjust the frequency of the triangle wave driving current (frequency of the carrier wave) through the laser driver 4 so that the period T of the MHPs measured by the MHP extracting portion 7 is a period T0 that is specified in advance.

Moreover, while in the present embodiment the period T for the MHPs used in the adjustment is the period when the object 10 is in the stationary state, there is no limitation thereto, but rather the moving average of the periods for a specific number of MHPs, measured directly previous to the adjustment, may be used as the period T to adjust the amplitude or frequency of the carrier wave.

The present embodiment may be applied when it is known that the object 10 is vibrating, or when it is known that the velocity of the object 10 is large.

A yet further embodiment according to the present disclosure is explained next. In the present embodiment as well, the structure of the sensor is the same as that in the above embodiment, and thus the codes in FIG. 7 are used in the explanation.

The resolution for the displacement D and the velocity V of the object 10 increases proportionately with the number of sampling clocks included in one period of the MHPs. When the distance between the semiconductor laser 1 and the object 10 becomes large, the frequency of the MHPs increases (the number of MHPs gets larger), and thus the number of sampling clocks included in one MHP period decreases, reducing the resolution of the displacement D and the velocity V. That is, when the distance from the object 10 is multiplied by A, then the number of sampling clocks included in one MHP period is reduced to 1/A times, reducing the resolution of the displacement D and the velocity V by A times.

Given this, if the emphasis is on the resolution of the displacement D or the velocity V, by reason of the distance from the object 10 being large, then an adjustment that is different from that in the otehr embodiment may be performed.

That is, when the carrier wave adjusting portion 11 inputs a resolution-emphasizing adjustment instruction MHP from an operator, for example, then the amplitude or frequency of the triangle wave driving current (the amplitude or frequency of the carrier wave) is reduced by a specific amount from the immediately previous value by the laser driver 4. When the amplitude or frequency of the carrier wave is adjusted so as to be reduced, then the period of the MHP, when compared to prior to the adjustment, becomes longer, even if the distance to the object 10 is the same, thus making it possible to increase the number of sampling clocks included in a single MHP period, thus enabling an increase in the resolution for the displacement D or velocity V. Note that the method for adjusting explained in the above embodiment may be used as an initial adjusting method.

Moreover, while shortening the MHP period reduces the resolution of the displacement D and the velocity V when the distance to the object 10 is large, it increases the number of MHPs, where the frequency distribution of the periods of the MHPs is roughly a Gaussian distribution, making it possible to calculate a reference period with good accuracy. Conversely, when the distance to the object 10 is short, then the MHP period becomes longer, increasing the resolution for the displacement D and the velocity V, but because the variance in the Gaussian distribution of the periods of the MHPs increases proportionately with the period, and because the number of MHPs also becomes smaller, the accuracy of the reference period is reduced.

The following adjustments may be made if one wishes to emphasize measurement accuracy by reason that the distance to the object 10 is small.

When the carrier wave adjusting portion 11 inputs an accuracy-emphasizing adjustment instruction signal from an operator, for example, then the amplitude or frequency of the triangle wave driving current (the amplitude or frequency of the carrier wave) is increased by a specific amount from the immediately previous value by the laser driver 4. Doing so enables an increase in accuracy of the reference period for the MHP, enabling an increase in measurement accuracy of the displacement D and/or the velocity V.

Figure 9:
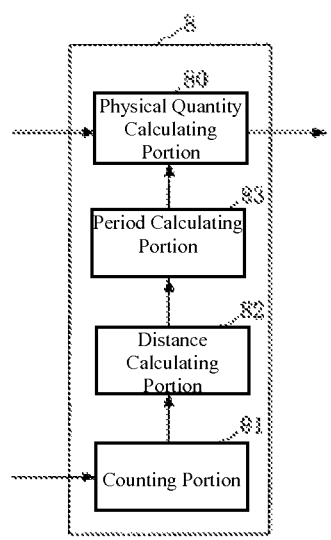
FIG. 9 is a block diagram illustrating an example of a structure of a calculating portion in a further embodiment according to the present disclosure.

An embodiment according to the present disclosure is explained next. While in the above embodiments the reference period N0 is used as the period for the MHP when the object 10 is in a stationary state, in the present embodiment a different way to calculate the reference period N0 is explained. FIG. 9 is a block diagram illustrating an example of a structure for a calculating portion 8 according to this embodiment according to the present disclosure. The calculating portion 8 is structured from a physical quantity calculating portion 80, a counting portion 81, a distance calculating portion 82, and a period calculating portion 83. The structure of the physical quantity sensor as a whole may be identical to those in the above embodiments, but it is necessary for the rate of change of the oscillating wavelength of the semiconductor laser 1 to be constant, and for the maximum value $\lambda b$ for the oscillating wavelength and the minimum value $\lambda a$ for the oscillating wavelength to each be constant, as well as for the difference $\lambda b - \lambda a$ therebetween to also be constant.

The counting portion 81 counts the number of MHPs included in the output of the filter portion 6 separately for the first oscillating period P1 and the second oscillating period P2. The counting portion 81 may use a counter formed from logical gates, or may use something that performs counting of the frequency of the MHPs (that is, the number of MHPs per unit time) using an FFT (Fast Fourier Transform).

The distance calculating portion 82 then calculates the distance to the object 10 based on the minimum oscillating wavelength $\lambda a$ and maximum oscillating wavelength $\lambda b$ of the semiconductor laser 1 and the numbers of MHPs counted by the counting portion 81. In the present embodiment, the state of the object 10 is assumed to be either in a minimally displaced state that fulfills specific conditions or a displaced state wherein there is greater motion than in the minimally displaced state. When the average displacement of the object 10 per period for the oscillating period P1 and the oscillating period P2 is defined as V, the minimally displaced state is the state wherein $(\lambda b - \lambda a)/\lambda b > V/Lb$ is satisfied (where Lb is the distance at time t), and the displaced state is defined as the state wherein $(\lambda b - \lambda a)/\lambda \leq V/Lb$ is fulfilled.

First the distance calculating portion 82 calculates distance candidate values $L\alpha(t)$ and $L\beta(t)$ and velocity candidate values $V\alpha(t)$ and $V\beta(t)$ at the present time t as shown in the following expressions:

[Expression 1]

$$L\alpha(t) = \lambda a \times \lambda b \times (\text{MHP}(t-1) + \text{MHP}(t))/(4 \times (\lambda b - \lambda a)) \quad (4)$$

[Expression 2]

$$L\beta(t) = \lambda a \times \lambda b \times (|\text{MHP}(t-1) - \text{MHP}(t)|)/(4 \times (\lambda b - \lambda a)) \quad (5)$$

[Expression 3]

$$V\alpha(t) = (\text{MHP}(t-1) - \text{MHP}(t)) \times \lambda b/4 \quad (6)$$

[Expression 4]

$$V\beta(t) = (\text{MHP}(t-1) + \text{MHP}(t)) \times \lambda b/4 \quad (7)$$

In Equation (4) through Equation (7), MHP (t) is the number of MHPs calculated at the current time t, and MHP (t−1) is the number of MHPs calculated one time prior to MHP (t). For example, if MHP (t) is the result of counting during a first oscillating period P1, then MHP (t−1) is the result of counting during a second oscillating period P2, and, conversely, if MHP (t) is the result of counting during a second counting period P2, then MHP (t−1) is the result of counting during a first oscillating period P1.

The candidate values $L\alpha(t)$ and $V\alpha(t)$ are values that are calculated assuming that the object 10 is in the minimally displaced state, and the candidate values $L\beta(t)$ (t) and $V\beta(t)$ are values that are calculated assuming that the object 10 is in the displaced state. The distance calculating portion 82 performs the calculations in Equation (4) through Equation (7) each time the number of MHPs is counted by the counting portion 81 (that is, with each oscillating period).

Following this, the distance calculating portion 82 calculates, using the following equations, a historic displacement, which is the difference between the candidate value for the distance at the current time t and the candidate value for the distance at the immediately previous time, separately for the minimally displaced state and for the displaced state. Note that in Equation (8) and Equation (9) the candidate values for distance that are calculated one time previous to the current time t are defined as $L\alpha(t-1)$ and $L\beta(t-1)$.

[Expression 5]

$$V\text{cal}\alpha(t) = L\alpha(t) - L\alpha(t-1) \quad (8)$$

[Expression 6]

$$V\text{cal}\beta(t) = L\beta(t) - L\beta(t-1) \quad (9)$$

The historic displacement $V\text{Cal}\alpha(t)$ is the value that is calculated assuming that the object 10 is in minimally displaced state, and the historic displacement $V\text{Cal}\beta(t)$ is the value that is calculated assuming that the object 10 is in displaced state. The distance calculating portion 82 performs the calculations in Equation (8) and Equation (9) each time the number of MHPs is counted by the counting portion 81. Note that in Equation (8) and Equation (9), the direction wherein the object 10 is approaching the physical quantity sensor in the present embodiment is defined as the positive direction and the direction wherein it is moving away is defined as the negative direction.

Following this, the distance calculating portion 82 uses the results of the calculations in Equation (4) through Equation (9) to evaluate the state of the object 10.

As is described in Patent Document 1, the distance calculating portion 82 evaluates the object 10 to be in the minimally displaced state and to be undergoing motion at a constant velocity if the sign of the historic displacement $V\text{Cal}\alpha(t)$ that is calculated assuming that the object 10 is in the minimally displaced state is constant and the average value for the absolute values of the velocity candidate value $V\alpha(t)$, which is calculated assuming the minimally displaced state for the object 10, and the historic displacement $V\text{Cal}\alpha(t)$ are equal.

Moreover, as is described in Patent Document 1, the distance calculating portion 82 evaluates the object 10 to be in the displaced state and to be undergoing motion at a constant velocity if the sign of the historic displacement $V\text{Cal}\beta(t)$ that is calculated assuming that the object 10 is in the displaced state is constant and the average value for the absolute values of the velocity candidate value Vβ(t), which is calculated assuming the displaced state for the object 10, and the historic displacement VCalβ(t) are equal.

Furthermore, as is described in Patent Document 1, the distance calculating portion 82 evaluates the object 10 to be in the minimally displaced state and to be undergoing motion that is not motion at a constant velocity if the sign of the historic displacement VCalα(t) that is calculated assuming that the object 10 is in the minimally displaced state is inverting each time the number of MHPs is counted and the average value for the absolute values of the velocity candidate value Vα(t), which is calculated assuming the minimally displaced state for the object 10, and the historic displacement VCalα(t) are not equal.

Focusing on the velocity candidate value Vβ(t), the absolute value of Vβ(t) is a constant, and this value is equal to the rate of change of the wavelength (λb−λa)/λb of the semiconductor laser 1. Given this, the distance calculating portion 82 may evaluate that the object 10 is undergoing motion aside from motion at a constant velocity in a minimally displaced state when the absolute value of the velocity candidate value Vβ(t) that is calculated assuming that the object 10 is in the displaced state is equal to the rate of change of the wavelength and the velocity candidate value Vα(t) that is calculated assuming that the object 10 is in the minimally displaced state is not equal to the average value of the absolute value of the historic displacement VCalα(t).

Furthermore, as is described in Patent Document 1, the distance calculating portion 82 evaluates the object 10 to be in the displaced state and to be undergoing motion that is not motion at a constant velocity if the sign of the historic displacement VCalβ(t) that is calculated assuming that the object 10 is in the displaced state is inverting each time the number of MHPs is counted and the average value for the absolute values of the velocity candidate value Vβ(t), which is calculated assuming the displaced state for the object 10, and the historic displacement VCalβ(t) are not equal.

Focusing on the velocity candidate value Vα(t), the absolute value of Vα(t) is a constant, and this value is equal to the rate of change of the wavelength (λb−λa)/λb of the semiconductor laser 1. Given this, the distance calculating portion 82 may evaluate that the object 10 is undergoing motion aside from motion at a constant velocity in a displaced state when the absolute value of the velocity candidate value Vα(t) that is calculated assuming that the object 10 is in the minimally displaced state is equal to the rate of change of the wavelength and the velocity candidate value Vβ(t) that is calculated assuming that the object 10 is in the displaced state is not equal to the average value of the absolute value of the historic displacement VCalβ(t).

The distance calculating portion 82 establishes the distance to the object 10 based on the aforementioned evaluation results. That is, the distance calculating portion 82, when it has been determined that the object 10 is in a minimally displaced state and is undergoing motion at a constant velocity, uses the distance candidate value Lα(t) as the distance to the object 10, and if the evaluation is that the object 10 is in a displaced state and undergoing movement at a constant velocity, uses the distance candidate value Lβ(t) as the distance to the object 10.

Moreover, if the evaluation is that the object 10 is in a minimally displaced state and is undergoing motion other than motion at a constant velocity, then the distance calculating portion 82 uses the distance candidate value Lα(t) as the distance to the object 10. However, the actual distance is an average value of the distance candidate values Lα(t). Moreover, if the evaluation is that the object 10 is in a displaced state and is undergoing motion other than motion at a constant velocity, then the distance calculating portion 82 uses the distance candidate value Lβ(t) as the distance to the object 10. However, the actual distance is an average value of the distance candidate values Lβ(t).

Following this, the period calculating portion 83 calculates the period of the MHP from the distance calculated by the distance calculating portion 82. The MHP frequency is proportional to the measured distance, and the MHP period is inversely proportional to the measured distance. Given this, if the relationship between the MHP period and the distance is calculated in advance and stored in a database (not shown) of the period calculating portion 83, then the period calculating portion 83 is able to calculate the period of the MHPs by obtaining, from the database, the period of the MHPs corresponding to the distance calculated by the distance calculating portion 82. Conversely, if an equation that indicates the relationship between the period of the MHPs and the distance is calculated and set in advance, then the period calculating portion 83 is able to calculate the period for the MHPs by substituting into the equation the distance calculated by the distance calculating portion 82.

The physical quantity calculating portion 80 calculates the displacement and velocity of the object 10 from the changes in the periods of the individual MHPs based on the measurement results by the MHP extracting portion 7 using the period calculated by the period calculating portion 83 as the reference period N0. That is, the physical quantity calculating portion 80 calculates the displacement D of the object 10 using Equation (2) that is explained in the above embodiments, and calculates the velocity V of the object 10 using Equation (3).

The present embodiment enables the calculation of the reference period N0 even in the case of an object 10 that cannot be caused to be stationary.

Figure 10:
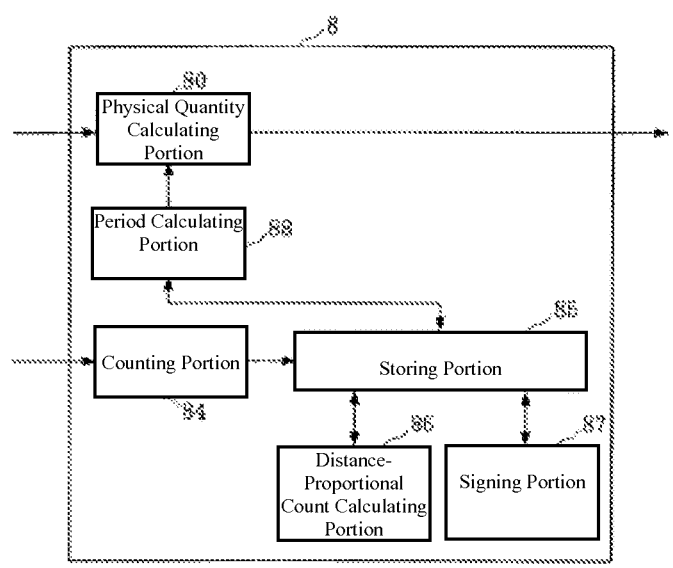
FIG. 10 is a block diagram illustrating an example of a structure of a calculating portion in a yet another embodiment according to the present disclosure.

Another form of embodiment according to the present invention is explained next. FIG. 10 is a block diagram illustrating an example of a structure of a calculating portion 8 according to the above embodiments according to the present invention. The calculating portion 8 includes: a physical quantity calculating portion 80; a counting portion 84 for counting the number of MHPs included in an output voltage from a filter portion 6; a storing portion 85 for storing, for example, the results of counting by the counting portion 84; a distance-proportional count calculating portion 86 for calculating a number of MHPs NL that is proportional to the average distance between the semiconductor laser 1 and the object 10 (hereinafter termed the "distance-proportional count") through calculating the average value of the results of counting by the counting portion 84; a signing portion 87 for assigning a positive or negative sign to the most recent counting results by the counting portion 84 depending on the magnitude relationship between the immediately previous counting result by the counting portion 84 and twice the distance-proportional count NL calculated using a count result that is older than that counting result; and a period calculating portion 88 for calculating the period of the MHP from the distance-proportional count NL. The overall structure of the physical quantity sensor is identical to that in the above embodiments.

The counting portion 84 counts the number of MHPs included in the output of the filter portion 6 separately for the first oscillating period P1 and the second oscillating period P2. The counting portion 84 may use a counter formed from logical gates, or may use something that performs counting of the frequency of the MHPs (that is, the number of MHPs per unit time) using an FFT. The counting result by the counting portion 84 is stored in the storing portion 85.

Figure 11:
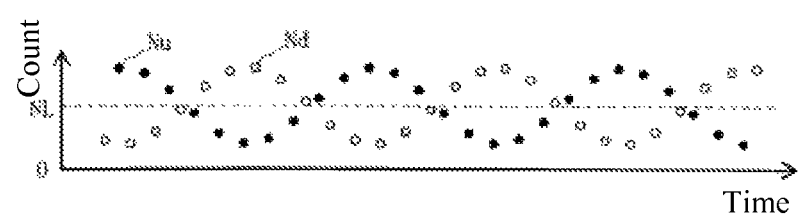
FIG. 11 is a diagram illustrating a first example of changes over time in the counting results by the counting portion in the above embodiments according to the present disclosure.

The distance-proportional count calculating portion 86 calculates a distance-proportional count NL from the counting result by the counting portion 84. FIG. 11 is a diagram for explaining the operation of the distance-proportional count calculating portion 86, a diagram showing the changes over time in the counting result by the counting portion 84. In FIG. 11, Nu is the counting result for the first oscillating period P1 and Nd is the counting result for the second oscillating period P2.

When the rate of change of distance of the object 10 is less than the rate of change of the oscillating wavelength of the semiconductor laser 1 and the object 10 is undergoing a simple harmonic oscillation, then the change in time in the counting result Nu and the change in time in the counting result Nd are sine waves with a mutual phase difference of 180°, as illustrated in FIG. 11. In Patent Document 1, the state of the object 10 at this time would be the minimally displaced state.

As is clear from FIG. 16, the first oscillating period P1 and the second oscillating period P2 are entered alternatively, so the counting results Nu and the counting results Nd appear alternatively. These counting results Nu and Nd are the sum or the difference of the distance-proportional count NL and the number of MHPs Nv that is proportional to the displacement of the object 10 (hereinafter termed the displacement-proportional count). The distance-proportional count corresponds to the average value of the sign wave form shown in FIG. 11. Moreover, the difference between the counting result Nu or Nd and the distance-proportional count NL corresponds to the displacement-proportional count Nv.

The distance-proportional count calculating portion 86 calculates the distance-proportional count NL through calculating the average value of the counting results for an even number of measurements up to two times previous to the current time t, as indicated by the following equation:

[Expression 7]

$$NL = (N(t-2) + N(t-3))/2 \quad (10)$$

In Equation (10), N(t−2) indicates that this is the number N of MHPs measured two times previous to the current time t, and N(t−3) indicates that this is the number N of MHPs measured three times previous to the current time t. If the measurement result N(t) at the current time t is the counting result Nu for a first oscillating period P1, then the counting result N(t−2), which is two times previous, is also a counting result Nu for the first oscillating period P1, and the counting result N(t−3) three times previous would be a counting result Nd for the second oscillation period P2. Conversely, if the measurement result N(t) at the current time t is the counting result Nd for a second oscillating period P2, then the counting result N(t−2), which is two times previous, is also a counting result Nd for the second oscillating period P2, and the counting result N(t−3) three times previous would be a counting result Nu for the first oscillation period P1.

While Equation (10) is an equation for the case of calculating the distance-proportional count NL from the counting results from two times, if the counting results for 2m times (where m is a positive integer) are to be used, then the distance-proportional count calculating portion 86 calculates the distance-proportional count NL as per the following equation:

[Equation 8]

$$NL = \{N(t-2m-1) + N(t-2m) + \ldots + N(t-2)\}/2m \quad (11)$$

Note that Equation (10) and Equation (11) are equations used at the initial period when starting the measurement of the displacement and velocity of the object 10, where, thereafter, the distance-proportional count NL is calculated through the following equation using the signed counting results, described below, rather than Equation (10), thereafter.

[Equation 9]

$$NL = (N'(t-2) + N'(t-3))/2 \quad (12)$$

N'(t−2) is the signed counting result after the signed counting process, described below, has been performed on the counting result N(t−2) from two times earlier, and N'(t−3) is the signed counting result after the signed counting process, described below, has been performed on the counting result N(t−3) from three times earlier. That which is used in Equation (12) is for when the counting result N(t) of the current time t has become the seventh counting results since the beginning of counting the number of MHPs.

Additionally, when Equation (11) is used at the early period at the beginning of counting, the distance-proportional count NL is calculated, beginning part way through, using the following equation that uses the signed counting results rather than Equation (11):

[Expression 10]

$$NL = \{N'(t-2m-1) + N'(t-2m) + \ldots + N'(t-2)\}/2m \quad (13)$$

The use of this Equation (13) starts when the counting result N(t) of the current time t is the $(2m \times 2 + 3)^{th}$ counting result since the beginning of counting of the number of MHPs.

The distance-proportional count NL is stored in the storing portion 85. The distance-proportional count calculating portion 86 performs the calculation process for the distance-proportional count NL, as described above, each time the number of MHPs is counted by the counting portion 84 (with each oscillating period).

Note that when there is an adequately large number of counting results to be used in calculating the distance-proportional count NL, then the distance-proportional count NL may be calculated from an odd number of times worth of counting results.

Next the signing portion 87 applies a positive or negative sign to the counting result N(t) by the counting portion 84 depending on the magnitude relationship between the counting result N(t−1) counted one time prior to the current time t and the 2 NL that is two times the distance-proportional count NL. The signing portion 87, specifically, executes the following equations:

[Expression 11]

$$\text{If } N(t-1) \geq 2NL \text{ Then } N'(t) \rightarrow -N(t) \quad (14)$$

[Expression 12]

$$\text{If } N(t-1) < 2NL \text{ Then } N'(t) \rightarrow +N(t) \quad (15)$$

Figure 12:
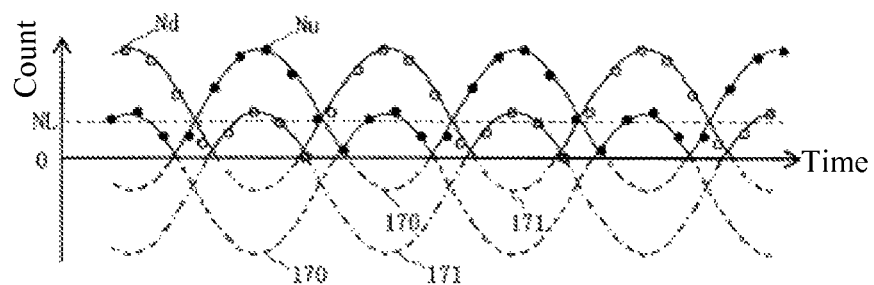
FIG. 12 is a diagram illustrating another example of changes over time in the counting results by the counting portion in the yet another embodiment according to the present disclosure.

FIG. 12 is a diagram for explaining the operation of the signing portion 87, a diagram showing the changes over time in the counting result by the counting portion 84. When the rate of change in distance of the object 10 is greater than the rate of change of the oscillating wavelength of the semiconductor laser 1, then the change over time in the counting result Nu has a waveform on the negative side that curves back to the positive side, shown by 170 in FIG. 12, and, similarly, the change over time in the counting result Nd has a waveform on the negative side, indicated by 171 in FIG. 12, that curves back to the positive side. In Patent Document 1, the state of the object 10 in the part wherein these curves in the counting result occurs is the displaced state. Other hand, the state of the object 10 in the parts wherein these curves do not occur in the counting result are the aforementioned minimally displaced state.

In order to calculate the physical quantity of the object 10 in an oscillation that includes the displaced state, it is necessary to evaluate whether the object 10 is in the displaced state or the minimally displaced state, and if the object 10 is in the displaced state, it is necessary to correct the counting result that is curved back to the positive side to draw the paths indicated by 170 and 171 in FIG. 12. Equation (14) and Equation (15) are equations for evaluating whether the object 10 is in the displaced state or the minimally displaced state. In FIG. 12, in the displaced state wherein the curve occurs in the counting result, $N(t-1) \geq 2$ NL is satisfied. Consequently, as shown by Equation (14), if $N(t-1) \geq 2$ NL is satisfied, then the counting result N(t) for the current time t by the counting portion 84 is assigned a negative sign, to be the signed counting result N'(t).

Conversely, when in the minimally displaced state wherein the curved is not produced in the measurement result in FIG. 11 and FIG. 12, $N(t-1) < 2$ NL is satisfied. Consequently, if $N(t-1) < 2$ NL is satisfied, as indicated in Equation (15), then the counting result N(t) of the present time t from the counting portion 84 is given a positive sign, to be the signed counting result N'(t).

The signed counting result N'(t) is stored in the storing portion 85. The signing portion 87 performs the signing process as described above each time the number of MHPs is counted by the counting portion 84 (with each oscillating period).

Note that the conditions for satisfying Equation (14) may be instead $N(t-1) > 2$ NL, and the condition for satisfying Equation (15) may be $N(t-1) \leq 2$ NL.

Following this, the period calculating portion 88 calculates the period T for the MHP from the distance-proportional count NL such as in the following equation:

$$T = C/(2 \times f \times NL) \quad (16)$$

Here f is the frequency of the triangle wave, and C is the speed of light.

The physical quantity calculating portion 80 calculates the displacement and velocity of the object 10 from the changes in the periods of the individual MHPs based on the measurement results by the MHP extracting portion 7 using the period calculated by the period calculating portion 88 as the reference period N0. That is, the physical quantity calculating portion 80 calculates the displacement D of the object 10 using Equation (2) that is explained in the above embodiments, and calculates the velocity V of the object 10 using Equation (3).

The present embodiment enables the calculation of the reference period N0 even in the case of an object 10 that cannot be caused to be stationary.

Figure 13:
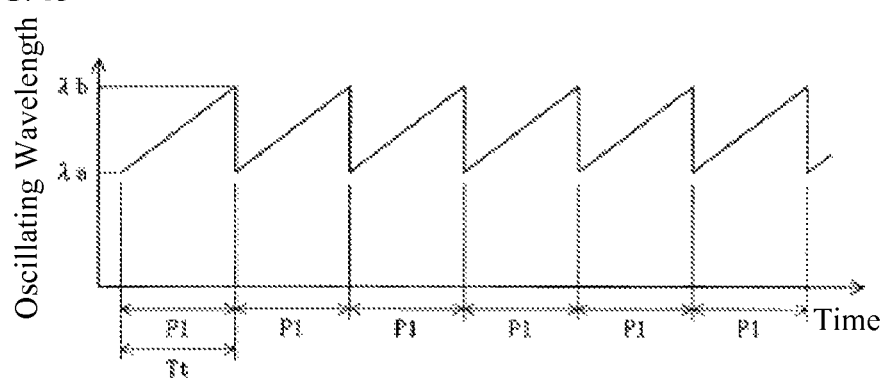
FIG. 13 is a diagram illustrating another example of changes over time in the oscillating wavelength of a semiconductor laser, according to an embodiment according to the present disclosure.

A yet further embodiment according to the present disclosure is explained next. While in the other embodiments the semiconductor laser 1 emitted a triangle wave, there is no limitation thereto, but rather the semiconductor laser 1 may emit a sawtooth waveform, as illustrated in FIG. 13, in the other embodiments. That is, in the present embodiment, the semiconductor laser 1 may be operated so as to have either the first oscillating period P1 or the second oscillating period P2 exist repeatedly. However, it is necessary for the semiconductor laser 1 to emit the triangle wave in the above embodiment.

Even when the semiconductor laser 1 emits in a sawtooth shape, as in the present embodiment, it is necessary for the rate of change of the oscillating wavelength of the semiconductor laser to be constant. The operation in the first oscillating period P1 the second oscillating period P2 is the same as for the case of the triangle-wave emission. As is illustrated in FIG. 13, in the case of emission of a sawtooth wave wherein there is the repetitive existence of only the first oscillating period P1, the processing for these first oscillating period P1 may be performed repetitively, and, of course, in the case of emission of a sawtooth wave wherein there is the repetitive existence of only the second oscillating period P2, the processing for these first oscillating period P2 may be performed repetitively.

Figure 14:
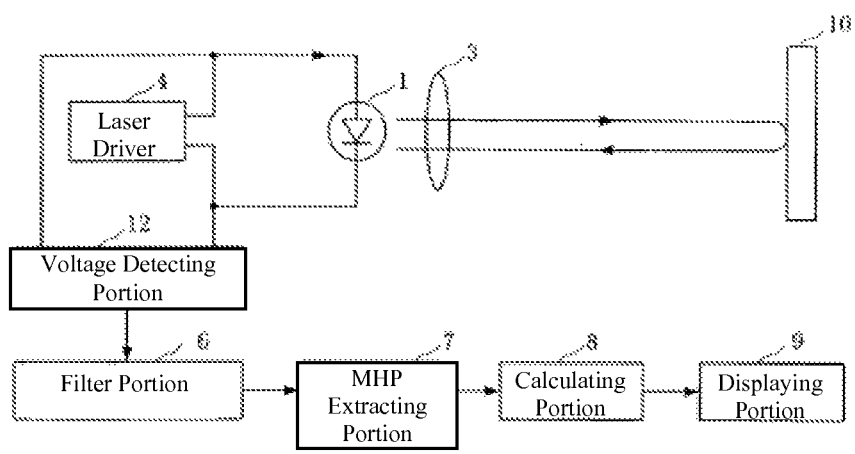
FIG. 14 is a block diagram illustrating a structure of a physical sensor according to a further embodiment according to the present disclosure.
Figure 15:
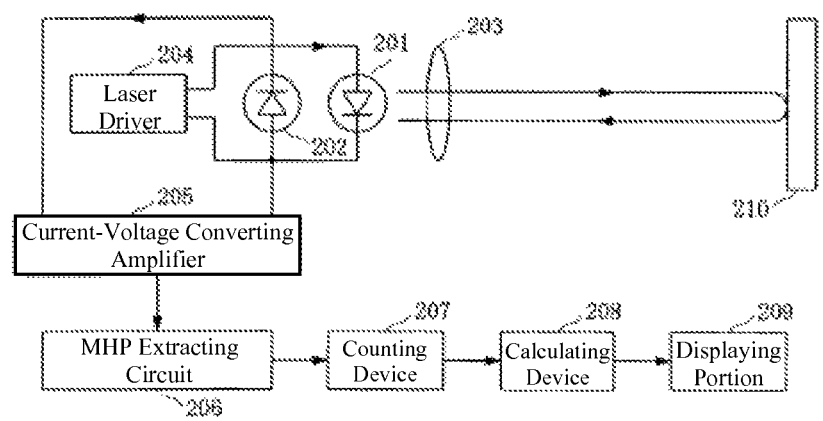
FIG. 15 is a block diagram illustrating the structure of a conventional laser measuring device.

Yet another embodiment according to the present disclosure is explained next. While in the above embodiments a photodiode 2 and a current-voltage converting/amplifying portion 5 are used as the detector for detecting the MHP, that includes the MHP waveforms, it is possible to detect the MHP waveforms without the use of a photodiode. FIG. 14 is a block diagram illustrating the structure of a physical quantity sensor according to this embodiment of the present disclosure, where those structures that are identical to those in FIG. 1 are assigned identical codes. The physical quantity sensor according to the present embodiment uses a voltage detecting portion 12 as the detector, instead of the photodiode 2 and the current-voltage converting/amplifying portion 5 of the above embodiments.

The voltage detecting portion 12 detects and amplifies the voltage between the terminals of the semiconductor laser 1, that is, the voltage between the anode and the cathode thereof. When interference is produced between the laser beam emitted from the semiconductor laser 1 and the return light from the object 10, the MHP waveform appears in the terminal-terminal voltage of the semiconductor laser 1. Consequently, it is possible to extract the MHP waveform from the terminal-terminal voltage of the semiconductor laser 1.

The filter portion 6 eliminates the carrier wave from the output voltage of the voltage detecting portion 12. The other structures in the physical quantity sensor are identical to those in the above embodiments.

In this way, in the present embodiment, it is possible to extract the MHP waveform without using a photodiode, making it possible to reduce the number of components in the physical quantity sensor when compared to those in the above embodiments, enabling a reduction in cost of the physical quantity sensor. Moreover, because no photodiode is used in the present embodiment, this enables the elimination of the effects from outside scattered light.

Note that in the above embodiments, at least the MHP extracting portion 7, the calculating portion 8, and the carrier wave adjusting portion 11 may be embodied through a computer that is provided with a memory and an interface, and a program that controls these hardware resources. The CPU follows a program that is stored in the memory to execute the processes explained above.

The present disclosure can be applied to technologies for measuring physical quantities of objects from information on interference that is produced through the self-coupling effect of a laser beam that is emitted from a semiconductor laser and return light from an object.

The invention claimed is:

1. A physical quantity sensor comprising:
a semiconductor laser emitting a laser beam toward an object to be measured;

an oscillating wavelength modulator causing the semiconductor laser to operate so that there is at least a first oscillating period wherein an oscillating wavelength continuously increases monotonically and a second oscillating period wherein the oscillating wavelength continuously decreases monotonically;

a detector detecting a mode hop pulse that includes an interference waveform that is produced through the self-coupling effect between the laser beam that is emitted from the semiconductor laser and return light from the object being measured;

a mode hop pulse extractor measuring, each time an interference waveform is inputted, a period of the interference waveform that is included in the output signal from the detector; and a calculator calculating at least a displacement or a velocity of the object being measured, based on the individual periods measured by the mode hop pulse extractor, wherein the calculator calculates at least one of the displacement and the velocity of the object from the frequency of the sampling clock for measuring the period of the interference waveform, a reference period, an average wavelength for the semiconductor laser, and an amount of change in the period measured by the mode hop pulse extractor relative to the reference period.

2. The physical quantity sensor as set forth in claim 1, further comprising:
a carrier wave adjustor able to adjust either an amplitude or a frequency of the oscillating wavelength modulation of the semiconductor laser.

3. The physical quantity sensor as set forth in claim 2, wherein:
the carrier wave adjustor adjusts the amplitude or frequency of the carrier wave so that the period of the interference waveform when the object being measured is stationary, or the average of a specific number of periods of the interference waveform measured immediately prior to the adjustment, is a period that is specified in advance.

4. The physical quantity sensor as set forth in claim 3, wherein:
the period that is specified in advance is a period that corresponds to a value that is one-half the maximum frequency of the interference waveform that can be processed by the physical quantity sensor.

5. The physical quantity sensor as set forth in claim 2, wherein:
the carrier wave adjustor reduces the amplitude or frequency of the carrier wave by a specific amount.

6. The physical quantity sensor as set forth in claim 2, wherein:
the carrier wave adjustor increases the amplitude or frequency of the carrier wave by a specific amount.

7. The physical quantity sensor as set forth in claim 1, wherein:
the calculator uses, as the reference period, a period for the interference waveform when the object being measured is stationary.

8. The physical quantity sensor as set forth in claim 2, further comprising:
a counter counting, separately for the first oscillating period and the second oscillating period, the number of interference waveforms included in the output mode hop pulse of the detector;
a distance calculator calculating a distance to the object being measured from the minimum oscillating wavelength, the maximum oscillating wavelength, and the counting result by the counter during the interval over which the number of interference waveforms is counted by the counter; and
a period calculator for calculating a period for the interference waveform from the distance calculated by the distance calculator; wherein:
the calculator uses, as the reference period, the period calculated by the period calculator.

9. The physical quantity sensor as set forth in claim 1, further comprising:
a counter counting, separately for the first oscillating period and the second oscillating period, the number of interference waveforms included in the output signal of the detector;
a distance-proportional count calculator calculating a distance-proportional count, which is a number of interference waveforms that is proportional to an average distance between the semiconductor laser and the object being measured, through calculating the average value of the number of interference waveforms; and
a period calculator calculating a period for the interference waveform from the distance-proportional count; wherein:
the calculator uses, as the reference period, the period calculated by the period calculator.

10. A physical quantity measuring method, comprising:
an oscillating step for causing a semiconductor laser to operate so that there is at least a first oscillating period wherein the oscillating wavelength continuously increases monotonically and a second oscillating period wherein the oscillating wavelength continuously decreases monotonically;
a detecting step detecting a mode hop pulse that includes an interference waveform that is produced through a self-coupling effect between the laser beam that is emitted from the semiconductor laser and return light from an object being measured;
a mode hop pulse extracting step measuring, each time an interference waveform is inputted, the period of the interference waveform that is included in the output signal obtained in the detecting step; and
a calculating step calculating at least a displacement or a velocity of the object being measured, based on the individual periods measured in the mode hop pulse extracting step, wherein
the calculating step calculates at least one of the displacement and the velocity of the object being measured from the frequency of the sampling clock for measuring the period of the interference waveform, a reference period, an average wavelength for the semiconductor laser, and an amount of change in the period measured by the mode hop pulse extracting step relative to the reference period.

11. The physical quantity measuring method as set forth in claim 10, further comprising:
a carrier wave adjusting step able to adjust either an amplitude or a frequency of the oscillating wavelength modulation of the semiconductor laser.

12. The physical quantity measuring method as set forth in claim 11, wherein:
the carrier wave adjusting step adjusts the amplitude or frequency of the carrier wave so that the period of the interference waveform when the object being measured is stationary, or the average of a specific number of periods of the interference waveform measured immediately prior to the adjustment, is a period that is specified in advance.

13. The physical quantity measuring method as set forth in claim 12, wherein:
the period that is specified in advance is a period that corresponds to a value that is one-half the maximum frequency of the interference waveform that can be processed.

14. The physical quantity measuring method as set forth in claim 11, wherein:
the carrier wave adjusting step reduces the amplitude or frequency of the carrier wave by a specific amount.

15. The physical quantity measuring method as set forth in claim 11, wherein:
the carrier wave adjusting step increases the amplitude or frequency of the carrier wave by a specific amount.

16. The physical quantity measuring method as set forth in claim 10, wherein:
the calculating step uses, as the reference period, a period for the interference waveform when the object being measured is stationary.

17. The physical quantity measuring method as set forth in claim 10, further comprising:
a counting step counting, separately for the first oscillating period and the second oscillating period, the number of interference waveforms included in the output signal obtained in the detecting step;
a distance calculating step calculating a distance to the object being measured from the minimum oscillating wavelength, the maximum oscillating wavelength, and the counting result by the counting step during the interval over which the number of interference waveforms is counted in the counting step; and
a period calculating step calculating a period for the interference waveform from the distance calculated by the calculating step; wherein:
the calculating step uses, as the reference period, the period calculated in the period calculating step.

18. The physical quantity measuring method as set forth in claim 10, further comprising:
a counting step counting, separately for the first oscillating period and the second oscillating period, the number of interference waveforms included in the output signal obtained in the detecting step;
a distance-proportional count calculating step calculating a distance-proportional count, which is a number of interference waveforms that is proportional to an average distance between the semiconductor laser and the object being measured, through calculating the average value of the number of interference waveforms; and
a period calculating step calculating a period for the interference waveform from the distance-proportional count; wherein:
the calculating step uses, as the reference period, the period calculated in the period calculating step.

* * * * *